LATTICE TYPE PHASE SHIFTING NETWORK

Filed Oct. 8, 1968 2 Sheets-Sheet 1

INVENTOR
ALLEN F. PODELL
BY
Kenway, Jenney & Hildreth
ATTORNEYS

INVENTOR
ALLEN F. PODELL
BY
Kenway, Jenney & Hildreth
ATTORNEYS 3,529,233

LATTICE TYPE PHASE SHIFTING NETWORK

Allen F. Podell, Cambridge, Mass., assignor to Adams-Russell Co., Inc., Waltham, Mass., a corporation of Massachusetts

Filed Oct. 8, 1968, Ser. No. 765,866

Int. Cl. H03h *7/04*

U.S. Cl. 323—124 7 Claims

ABSTRACT OF THE DISCLOSURE

A phase shifting network operating in the radio frequency range for transmitting with a phase shift, a signal from an unbalanced source to an unbalanced load. The network is free from the loss characteristics and frequency limitations inherent in the use of a balun to connect the phase shift network to either the source or the load. In addition to the inductors required for the phase shift lattice, one additional inductor closely coupled magnetically to one of the lattice inductors is used to provide for coupling to the source or load.

FIELD OF THE INVENTION

This invention relates in general to phase shifting networks for operation in the radio frequency region and more particularly to a low loss phase shifting network for coupling an unbalanced source to an unbalanced load.

BACKGROUND OF THE INVENTION

Phase shifting networks having substantially infinite frequency cutoff are useful in a number of high frequency coupling circuits. Such networks may be employed in various forms of hybrid couplers or other directional coupling networks. In most such instances the phase shift network should not introduce a frequency limitation for the overall circuit. It is, of course, highly desirable that the network introduce a minimum of loss and require a minimum of space. One phase shift network which has frequently been employed, in the past, is a simple lattice network with series inductors and cross connected capacitors. Such a network provides the requisite one pole characteristic, has low loss and is economical in terms of both space and components. However, the simple lattice network is not sufficient, of itself, if both the driving source and the load are unbalanced. In order to couple such a phase shift network between an unbalanced source and an unbalanced load, a balun is connected in series with the lattice network, as illustrated in the prior art configuration of FIG. 1. The balun, however, introduces a significant amount of loss as well as being somewhat frequency limiting. Further, in high frequency applications, the additional space of the balun is a limiting design factor.

SUMMARY OF THE INVENTION

The phase shift network of this invention provides for an infinite cutoff, one pole phase shift characteristic and the network may be coupled between an unbalanced source and an unbalanced load. The network is formed of a lattice circuit including a pair of parallel inductors cross connected with a pair of capacitors in a basic lattice configuration. A third inductor is closely coupled magnetically with one of the lattice inductors and series connected electrically with the other lattice inductor. The lattice inductor which is magnetically coupled to this third inductor is connected at one end to a point of potential reference, typically ground. This pair of magnetically coupled inductors form a transmission line and either the source or the load may be connected directly across this transmission line between the point of potential reference and the unconnected end of the third inductor. In those instances where the source is so connected, the load is connected between the point of potential reference and the unconnected end of the second inductor of the lattice network. Operatively, a signal from the source is transmitted along this line to the lattice network, where it undergoes a phase shift and thence to the load.

The network may also be formed by connecting the load across the end terminals of the transmission line formed by the magnetically coupled conductors and connecting the source between the point of potential reference and the free end of the second lattice inductor. In this instance the signal is coupled directly to the lattice network, undergoes a phase shift passing through it, and is then transmitted along the transmission line to the unbalanced load.

In one embodiment of the invention the inductors are wound upon the same core in directions such that the current passes through them to flux the core in the same direction, and the inductance value for each inductor may therefore be reduced, thereby further reducing the loss of the network. Additionally, in those high frequency applications which require a ferrite core this technique reduces the number of cores or beads required and hence the cost and space requirements are also reduced.

DESCRIPTION OF PREFERRED EMBODIMENTS

Figure 1:
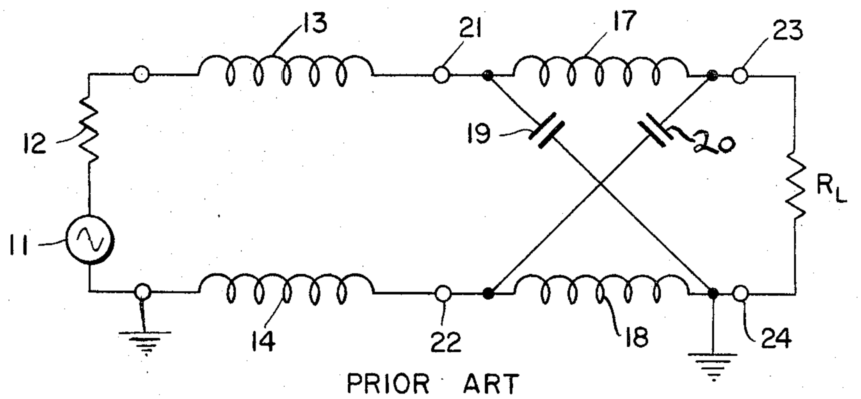
PRIOR ART FIG. 1
FIG. 1 is an illustration in schematic form of a prior art phase shift network.

A prior art circuit for a phase shift network coupling an unbalanced high frequency source to an unbalanced load is illustrated in FIG. 1. The source 11, shown in series with a resistance 12, is coupled through a transmission line formed of inductors 13 and 14, having a characteristic impedance equal to the value of the resistance 12. This transmission line forms a balun coupling the source 12 to the balanced input at terminals 21 and 22 of a lattice network formed by inductors 17 and 18 and capacitors 19 and 20. The output terminals 23 and 24 of this lattice network have connected acros them a load $R_L$. Terminal 24 is also connected to ground. This prior art circuit might also be represented with the series combination of driving source 11 and impedance 12 connected between terminals 23 and 24 and the output load $R_L$ connected across the end of the balun formed by inductors 13 and 14. Such a network provides a single pole phase shift characteristic, however, the balun introduces both frequency limitations and loss.

Figure 2:
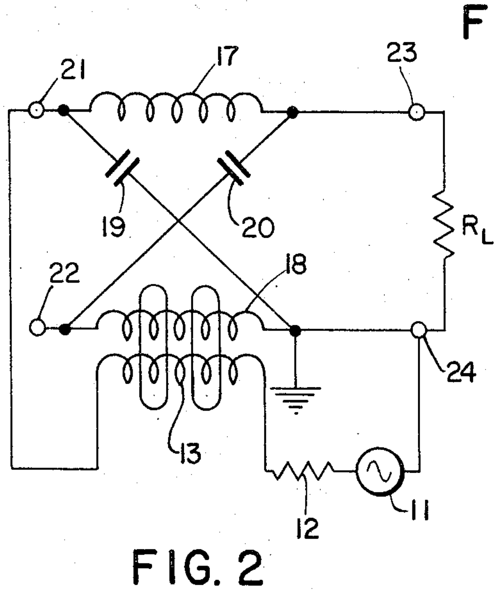
FIG. 2 is an illustration in schematic form of one embodiment of the phase shift network of this invention.

In FIG. 2 there is illustrated one embodiment of the phase shift network of the invention. The lattice network shown in FIG. 2 again includes inductors 17 and 18, capacitors 19 and 20, one pair of end terminals 21 and 22 and the other pair 23 and 24. In this embodiment terminal 24 is grounded and the output load $R_L$ is connected directly between terminals 23 and 24. Inductor 13 is shown, as in the illustration of FIG. 1, serially connected at terminal 21 to inductor 17. However, inductor 13, in the embodiment of FIG. 2, is magnetically coupled to inductor 18 and the values of the two inductors are made substantially identical thereby forming a transmission line. The input source 11 is connected between the point of potential reference and the free end of the inductor 13. The inductor 14 has been entirely deleted from the circuit of FIG. 2.

In operation the signal applied between terminal 24 and the free end of inductor 13 passes along the transmission line formed of inductors 13 and 18 and is then applied across terminals 21 and 22. Thus, the terminals 21 and 22 remain balanced, as in the prior art illustration with the same signal being applied between these two terminals as would be through the balun of FIG. 1. Since there is no balun the losses associated with it are eliminated.

That the balun 13 and 14 may be replaced by magnetically coupling the inductor 13 in parallel with inductor 18 may be seen by a consideration of the potentials developed in the circuit of FIG. 1. The end of inductor 18 connected to terminal 24 is at ground potential as is also the end of inductor 14 connected to the bottom of the driving source 11. The other ends of each of these inductors are connected to terminal 22 and hence are at the same potential. Accordingly, inductor 18 may perform the same function as inductor 14 provided that a second inductor identical to inductor 18 is magnetically coupled to inductor 18 to form the input transmission line. This additional inductor 13 should, however, be magnetically isolated from inductor 17. In one suitable form of the circuit illustrated in FIG. 2 the inductors 18 and 13 are formed of a coiled co-axial cable with the number of turns being used to control the inductance. The inductor 17 may be formed of one of the conductors of a second co-axial cable. The phase shift characteristic will, of course, be controlled by the values of the inductors and capacitances, for example, inductors 17 and 18 may each have a value of $L_1$ with the capacitors 19 and 20 each having a value of $C_1$. Conductor 13 would then be required to have an inductance $L_1$ to form a transmission line with inductor 18.

Figure 3:
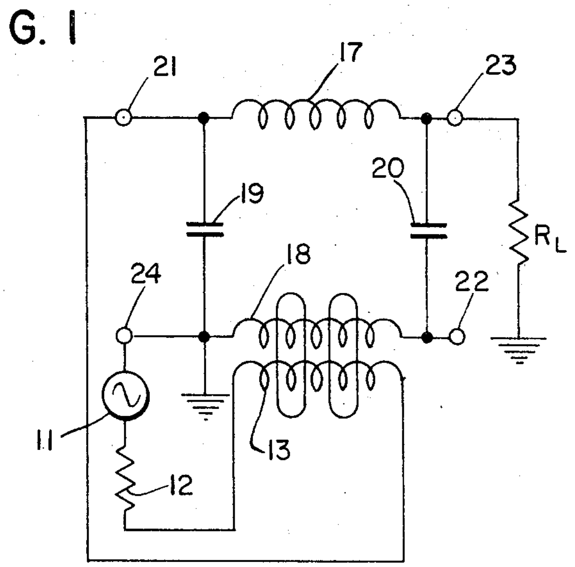
FIG. 3 is an illustration in schematic form of a second embodiment of the phase shift network of this invention.

In the circuit illustrated in FIG. 3, the transmission line formed of inductors 18 and 13 is again formed of a coiled co-axial cable, however, in this embodiment, the cable is wound upon a common core, which may be an air core, with inductor 17. In order that the flux generated in the core by the current passing through the inductances will be in the same direction the coiled co-axial cable which forms the transmission line must be wound in the opposite direction from that which forms the inductor 17. Thus, in this arrangement the position of terminals 22 and 24 relative to the position of terminals 21 and 23 is reversed. In order to obtain a phase shift characteristic identical to that of the circuit of FIG. 2, the inductors 17 and 18 should have inductance values of $L_1/2$, since the current passing through these inductances is now in the same direction with respect to the common core. The capacitance values remain at $C_1$. The inductor 13 must also be reduced to an inductance value of $L_1/2$, since it forms a transmission line with inductor 18. In fact, where the transmission line is formed of a coiled co-axial cable, the inductance of conductor 13 is inherently the same as the inductance of conductor 18. Since the transmission line formed of conductors 18 and 13 is co-axial cable, then conductor 13 is de-coupled magnetically from inductor 17, even when wound on the same core.

While the capacitances 19 and 20 are shown as two separate capacitors connected between the terminals 21 and 24 and 23 and 22 respectively, for very high frequency applications one capacitor of twice the capacitance may be employed. Thus a single capacitor value $2C_1$ might be employed without significantly altering the phase shift characteristics of the network.

Figure 4:
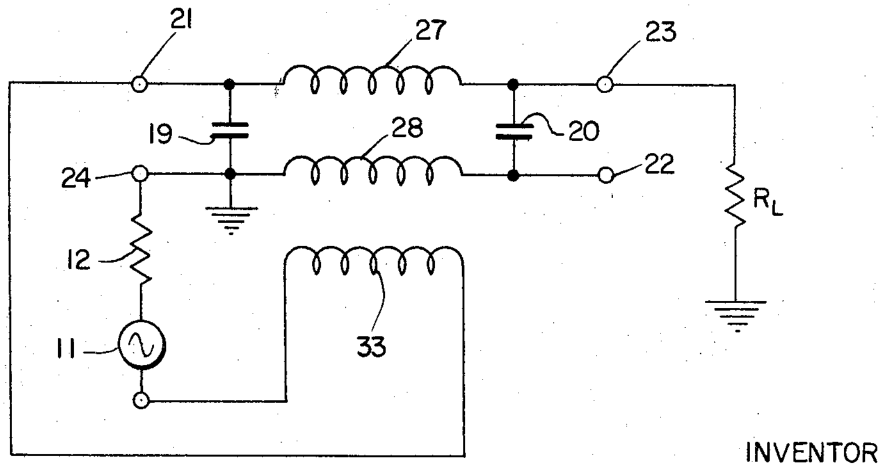
FIGS. 4, 5, 6 and 7 are illustrations in schematic form of further embodiments of the phase shift network of the invention.

In FIG. 4 and embodiment generally similar to that illustrate in FIG. 3 is shown, with however inductors being trifilar wound around a common core, rather than coiled co-axial cables. Thus each of the inductors 27, 28 and 33 are formed of wire wound the appropriate number of times around a single core to provide an inductance equal to $L_1/2$ for each of the inductors 27, 28 and 33. As in the previous embodiment the inductors 28 and 33 must be magnetically coupled in order to form the transmission line and inductors 27 and 28 must be wound on the same core in opposite directions, and are approximately one half the value of the inductances for the lattice network. Additionally, inductors 27 and 33 should be magnetically de-coupled. With a trifilar winding, this may be achieved by maintaining the orientation of the wires as they are wound such that inductor 28 remains between inductors 27 and 33 and thus isolates these two inductors from one another. Again, the choice of core material will depend upon the frequency characteristics desired and the size, loss and power requirements. Various grades of ferrite are available and low loss dielectrics such as Teflon, manufactured by Du Pont or a cross linked polystyrene material, such as that sold under the trade name Rexalite by Brand Rex Corp., can be used where ferrites are too lossy and air wound coils cannot be self-supporting.

Figure 5:
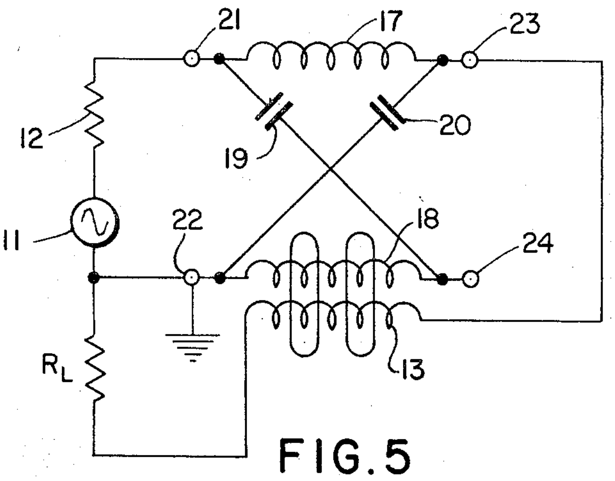
Figure 6:
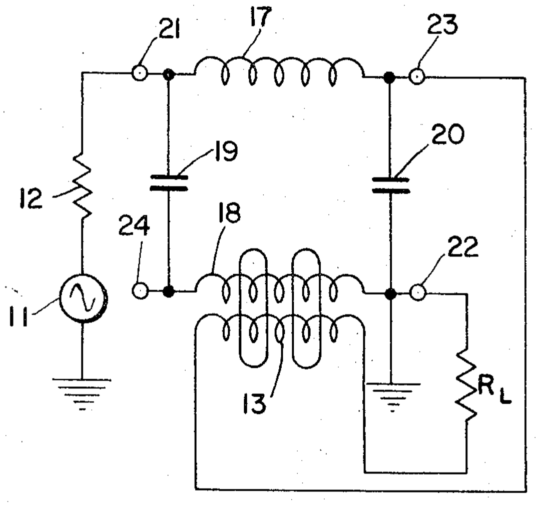
Figure 7:
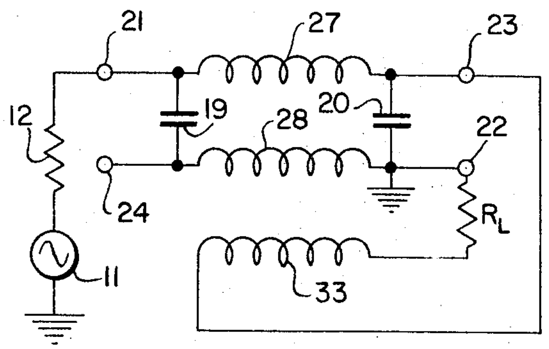

In FIGS. 5, 6 and 7 similar embodiments of the phase shifting network of the invention are shown but the driving source is coupled directly across the input terminals of the lattice section and the load is coupled across the end of the transmission line formed by one inductor of the lattice section and the third inductor. Thus in FIG. 5 the driving source 11, together with its matching impedance 12, is connected between terminals 21 and 22 with terminal 22 grounded. The load resistance $R_L$ is coupled across the end of the coiled co-ax which forms inductors 13 and 18 with the other end of inductor 13 being connected directly to terminal 23. In the embodiment of FIG. 5 the inductors 17 and 18 are not wound on the same core and hence the values for inductors 17 and 18 would be the full value, $L_1$, with the capacitors having a value of $C_1$. In FIG. 6 an embodiment employing co-axial cables is illustrated where the co-axial cables are wound about a common core such that inductors 17 and 18 flux the core in the same direction and hence the inductance value for each inductor 17, 18 and 13 is $L_1/2$. Similarly in the trifilar winding embodiment of FIG. 7, each of the inductances values would be $L_1/2$.

Figure 8:
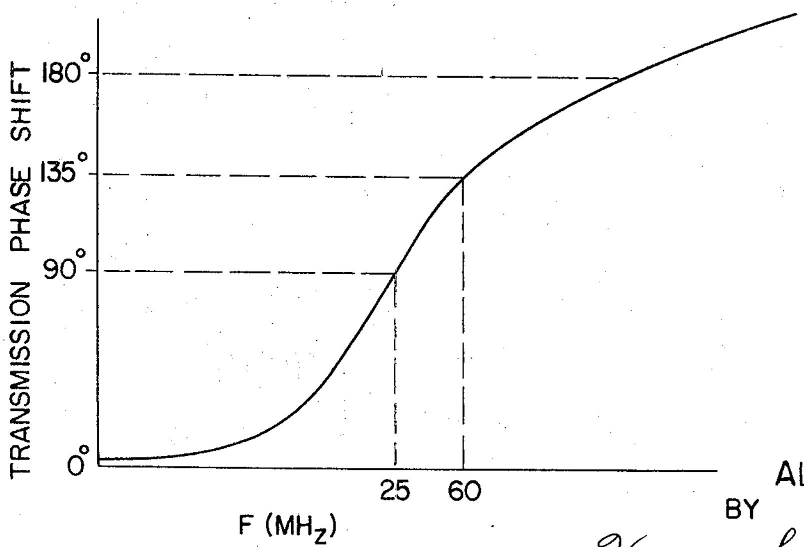
FIG. 8 is a graphical representation of a typical phase shift frequency characteristic for a network constructed in accordance with the principles of this invention.

In one specific example of a phase shifting network constructed in accordance with the embodiment of FIG. 4, each of the trifilar windings 27, 28 and 33 had inductance values of .151 microhenry and a single capacitor connected between terminals 23 and 22 was used which capacitor had a value of 120.8 picofarads, corresponding to a pair of capacitors with a $C_1$ value of 60.4 picofarads. This configuration had a center frequency of 60 mhz. and a bandwidth in excess of 10 mhz. A typical frequency versus phase shift characteristic for this circuit is illustrated in FIG. 8.

Having described the invention various modifications and improvements will now occur to those skilled in the art and the invention should be construed as limited only by the spirit and scope of the appended claims.

What is claimed is:

1. A phase shift network for coupling an unbalanced driving source of relatively high frequency to an unbalanced load comprising, first and second inductors, and capacitance connected therebetween to form a single pole lattice network, a third inductor closely coupled magnetically to said first inductor to form a transmission line therewith, said third inductor being generally de-coupled magnetically from said second inductor, said third inductor being connected electrically in series with said second inductor, one end terminal of said first inductor being connected electrically to a point of potential reference, the unconnected ends of the serial combination of said second and third inductors forming first and second connecting terminals for said network, said driving source being connected between one of said connecting terminals and said point of potential reference and said load being connected between the other of said connecting terminals and said point of potential reference.

2. A network in accordance with claim 1 wherein said first and second inductors are formed of a coiled length of co-axial cable.

3. A network in accordance with claim 1 wherein said first and second inductors are formed of a pair of bifilar wound conductors.

4. A network in accordance with Claim 1 wherein said capacitance is formed of first and second capacitors, said first capacitor being connected from the junction between said second and third indutors and said point of potential reference and said second capacitor being connected from the unconnected end of said second inductor to the unconnected end of said first inductor.

5. A network in accordance with claim 1 wherein said first, second and third inductors are wound on a common core said second inductor being wound in the opposite direction from said first and third inductor.

6. A network in accordance with claim 5 wherein said capacitance is formed of a first capacitor connected from the juntion between the said second and third inductors to said point of potential reference and said second capacitor is connected from the unconnected end of said second inductor to the unconnected end of said first inductor.

7. A network in accordance with claim 1 wherein said first, second and third inductors are trifilar wound about a common core, said first inductor being wound in position between said second and third inductors, whereby said second and third inductors are magnetically decoupled from one another.

References Cited

UNITED STATES PATENTS

| | | | |
|---|---|---|---|
| 2,147,728 | 2/1939 | Wintringham | 323—123 X |
| 3,127,555 | 3/1964 | Honore et al. | 323—123 X |
| 3,449,696 | 6/1969 | Routh | 333—74 X |

J D MILLER, Primary Examiner

A. D. PELLINEN, Assistant Examiner

U.S. Cl. X.R.

333—74